June 10, 1969  B. RANKIN  3,449,052

OPTICAL VERNIER INTERPOLATOR

Filed May 7, 1964

INVENTOR.
BAYARD RANKIN
BY Williams, David
Hoffmann & Yunt
ATTORNEYS

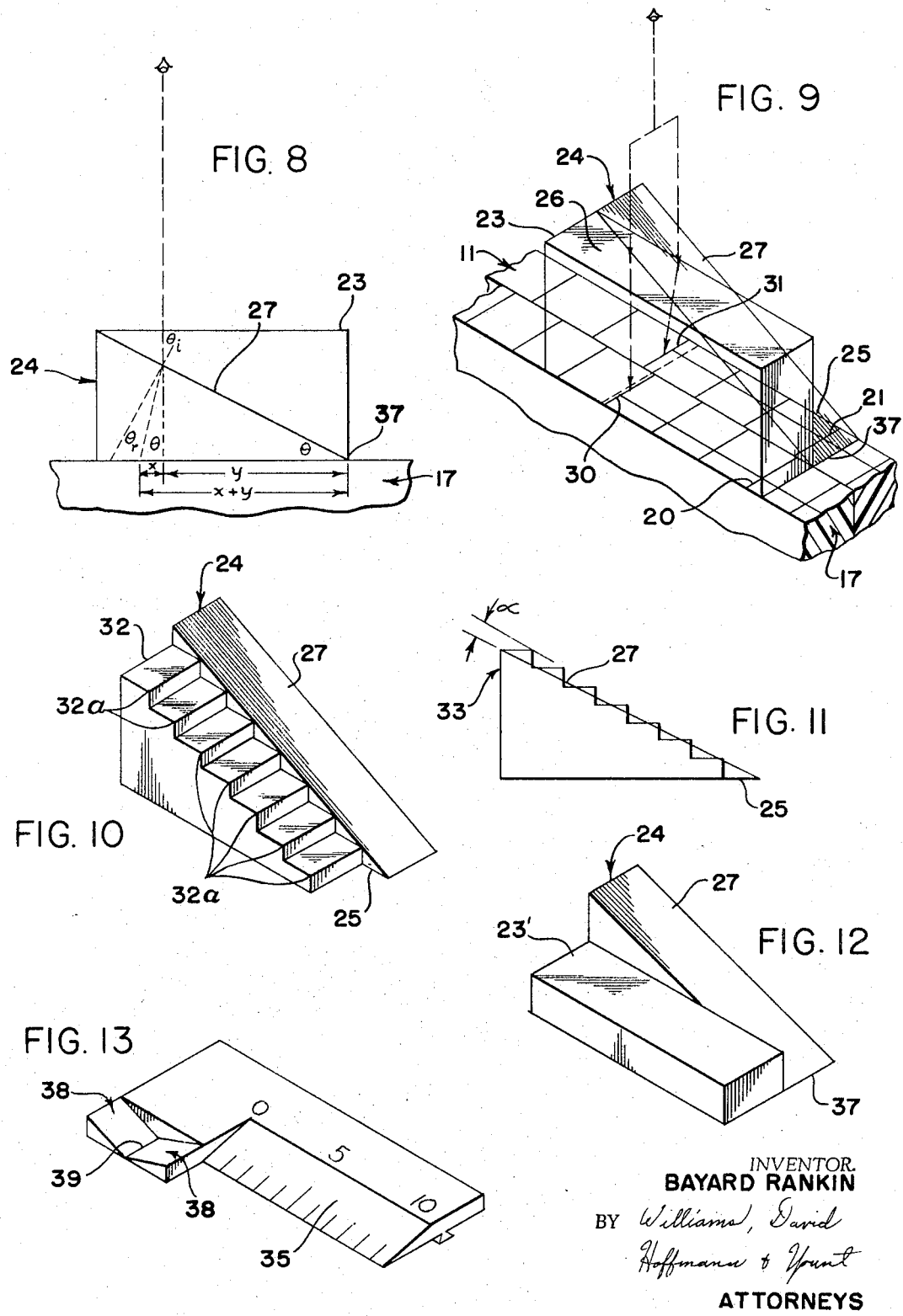

United States Patent Office 3,449,052
Patented June 10, 1969

3,449,052
OPTICAL VERNIER INTERPOLATOR
Bayard Rankin, 2853 Coleridge Road,
Cleveland Heights, Ohio 44118
Filed May 7, 1964, Ser. No. 365,629
Int. Cl. G01b 11/04, 5/00; G02b 27/02
U.S. Cl. 356—170
12 Claims

ABSTRACT OF THE DISCLOSURE

An optical interpolator is provided which has a prism that contracts a primary scale to cause its subdivisions to be spaced in accordance with the spacing of a vernier scale which cooperates with the primary scale. When the interpolator is positioned to cause coincidence between the primary scale and vernier scale when the primary scale is viewed through the prism, the interpolator is set in a position relative to the primary scale where a second vernier scale on the interpolator has a predetermined interpolated relationship with respect to the subdivisions of the primary scale as the first vernier scale.

---

This invention relates generally to verniers and more particularly to a new and simplified optical vernier interpolator structure and system.

This invention relates to an optical vernier interpolator composed principally of an optical part and an interpolator scale, the optical part and the scale being rigidly attached together. The interpolator is used in conjunction with a primary scale and an adjacent vernier scale for precision measurement.

In the past, verniers generally have been described as a small auxiliary device used with a main device to obtain a fine measurment. An example of such a vernier is a short scale which is made to slide along the divisions of a graduated instrument in order to indicate parts of divisions. The scales involved may be linear, circular, or in general curvilinear and may be graduated with units divided into any number of convenient subdivisions, such as 10 or 60. In general, these verniers are installed on many mechanisms which require precise measurement for one reason or the other.

The limitations of accuracy obtainable with prior art verniers are based primarily in two sources. There are minute inherent errors in the inscription of scale markers since the spacings of divisions may be unequal or the marks of varying thickness. These inherent errors are small in absolute magnitude, but important in view of the fineness of measurement to which a vernier scale is being applied. Second, the accuracy of measurement obtainable with prior art verniers, even with the most perfect scale markers, is determined by the finite width of the scale markers. Little increase in the accuracy of measurement can be made with a given prior art vernier instrument beyond what can be read in the coincidence of scale markers.

To illustrate these points, a description of the well-known linear mechanical vernier graduated in tenths of a unit may be used. This mechanical vernier is one of two scales: (a) the primary scale having a series of scale markers thereon, and (b) a vernier scale having scale markers which are slightly more closely spaced than the markers of the primary scale. If measurement is being recorded in tenths of a unit, each tenth scale marker on the vernier can be made to coincide with each ninth scale marker of the primary scale. In general, the vernier scale is laid on or mounted along the primary scale. An origin, or zero marker, is indicated on each scale. If the vernier scale is displaced a certain distance in a positive direction along the primary scale, the displacement between the two zero markers represents the quantity to be measured. The measurement is begun by first reading the scale marker on the primary scale that immediately precedes the zero marker of the vernier. The measurement is completed by adding to the first reading the reading of the scale marker on the vernier that most nearly coincides with a marker of the primary scale. The second reading in this measurement is the contribution made possible by the presence of the vernier and is expressed in tenths of the smallest division on the primary scale. In carrying out the above measurement, however, two errors have entered. Primarily, the errors in the positioning of scale markers and errors in the thickness of the scale markers have contributed to some inaccuracies incurred in the reading of the vernier scale. Secondarily, the finite width of the scale markers have forced the operator to select one of a finite number of scale markers, namely, the one scale marker on the vernier that most nearly coincides with a marker of the primary scale. It is seen that the potentialities of the conventional system of primary and vernier scales are fully exhausted when finer measurment is excluded only by the minute irregularities of inscriptions and by the finite width of the scale markers.

Two approaches have been taken in the prior art to insure accuracy in vernier techniques. One approach is to refine the inscription of scale markers and to determine the graduations of the primary and vernier scales so that the width of the scale markers is the chief limitation to accuracy. A second approach, taken in conjunction with the first, is to use a magnifying or enlarging lens. It has been taught that this magnifying lens may be mounted in such a way that both the primary and the vernier scale will be enlarged in the vicinity where their scale markers most nearly concide. Either approach requires that the spacing of scale markers on the primary scale as compared to that on the vernier scale differ by a small amount comparable to the thickness of scale markers.

The optical vernier interpolator of the immediate invention is a simple instrument composed primarily of an optical part and secondarily of a scale, the optical part and the scale being rigidly attached. The instrument is used in conjunction with a primary scale and an adjacent vernier scale. The spacing of scale markers on the primary scale as compared to that on the vernier scale may differ by an amount considerably larger than the thickness of scale markers. Thus, the scale marker on the vernier and the scale marker on the primary scale that most nearly coincide display, on the average, a greater displacement than would be found on prior art vernier devices of comparable refinement. The scale of the optical vernier interpolator is in a position adjacent and parallel to the primary scale and is graduated in a manner and magnitude identical to the vernier scale. Thus, the scale of the optical vernier interpolator is a second vernier scale but for clarity will be called the interpolator scale. In general, the optical vernier interpolator improves the accuracy in reading the vernier scale in conjunction with the primary scale by providing a means of interpolating between the markers of the primary and the vernier scale that most nearly coincide. For certain applications, such as the generation of random numbers, as described in my copending application, Ser. No. 365,626, the optical vernier interpolator can be used to advantage without the interpolator scale. Thus, one form of the immediate invention is an optical instrument that is used in conjunction with a primary scale and an adjacent vernier scale.

The optical part of the immediate invention, when the invention is embodied in a linear device, may comprise a right angled prism with specially determined optical properties that slides freely over a primary scale. Due to the specially determined optical properties of the prism, there is for each fixed relative position of the vernier and primary scales a unique position of the optical vernier interpolator where the virtual image of the primary scale, as seen through the prism, coincides with the vernier scale. It is this unique position that permits an interpolation to be taken in the form of a reading of the interpolator scale against the primary scale. The fact that the presence of the interpolator contributes to a magnification in the accuracy of measurement can be seen from the following fact: If the scales are graduated in tenths of a unit and the primary and vernier scales are held in fixed relative position, then the virtual image of the primary scale can be made to move one tenth of a unit relative to the vernier scale by moving the interpolator freely over the scales for a distance of one unit.

The principle on which the interpolator is based has an analogy in the principle of using the extremity of a lever arm to read a small displacement. For example, when the fulcrum of a lever is placed so that the ratio of distances from the fulcrum to the two extremities is 10:1, a small displacement in the extremity nearest the fulcrum becomes translated into a displacement 10 times as great at the point of the second extremity. The small displacement in this analogy corresponds to the small displacement between the markers of the primary and the vernier scale that most nearly correspond. The multiplication of the small displacement by a factor of ten is, in the case of the optical vernier interpolator, effected by displacing the interpolator, itself, to a position over primary the scale where an exact coincidence between the vernier scale and the virtual image of the primary scale is achieved. Measurement of the small displacement between the markers of the primary scale 11 and vernier scale 17 is then made by reading the interpolator scale against the primary scale. Thus, the position of the interpolator, itself, corresponds to the position of the extremity furtherest from the fulcrum in the lever ram analogy. The small displacement to be measured is magnified by ten in the process of moving the interpolator so as to bring the virtual image of the primary scale, as seen through the prism, into coincidence with the vernier scale. After magnification, the displacement can be measured by the same technique that is offered by the prior art verniers, the only difference being that the scales to be used are the primary and the interpolator scales rather than the primary and the vernier scales.

Although it may be assumed for simplicity of description that the displacements to be measured, and thus the scales, are linear, and that the scales are graduated into ten parts per unit, it is clear that the principle involved in the optical vernier interpolator is adaptable to circular and, in general, curvilinear displacements and to displacements read in sixtieths of degrees as well as tenths of inches. When a deviation from linearity is present, the prism must be modified so that certain of its faces are no longer planer.

The optical vernier interpolator taken in conjunction with a primary and a vernier scale should be viewed first as a device with which to duplicate by new methods the kinds of measurements which can be made with prior art devices. From this point of view, the advantages of the immediate invention come primarily in the simpler scale structures that are required. The optical vernier interpolator should be viewed from a second point of view as potentially more accurate than prior art vernier devices for the following two purely statistical reasons:

First, although physical irregularities in scale impressions are in themselves a limitation to the accuracies that can be achieved by any method, one feature of the optical vernier interpolator minimizes this limitation. This feature is derived from the fact that the inscriptions on the primary scale, as transformed into their virtual images by the optics, have a spacing identical to that on the vernier scale. Thus, the optical coincidence that determines the interpolator's unique position over the scales is a simultaneous coincidence primarily of one inscription from the primary scale and one inscription from the vernier scale and secondarily of all of the inscriptions that are visible through the optical portion of the interpolator. Any physical irregularities in scale impression are thus averaged out in the reading.

Second, in the application of prior art verniers, the relative position of the primary and the vernier scales is first determined by the quantity being measured. A single measurement is read by interpreting the relative positions of the scale markers. No advantage is found in reading more than once, so long as the same relative position is held by the scales. On the other hand, in the application of the optical vernier interpolator, though the relative position of the primary and the vernier scale is first determined as before, the reading process is different. The reading of the interpolator scale is accomplished after setting the interpolator so that the vernier scale and the virtual image of the primary scale coincide. The interpolator cannot be set with ultimate precision and would not be given the same setting, even by the same operator, over a period of many trials. The setting of the interpolator has, in fact, a distribution of values whose average is the desired setting corresponding to exact coincidence of the vernier scale and the virtual image of the primary scale. This, however, means that an answer to an exact reading of a measurement can be obtained by averaging and the result of this averaging is independent of the small but finite width of the scale markers. Thus, while one reading of the interpolator could be made as accurate as the reading of a prior art vernier, the average of many readings on the interpolator would be more accurate. It is to be emphasized that the averaging process referred to here is carried out while the primary and vernier scales remain in fixed relative position.

While errors due to parallax are not usually a problem in the use of prior art vernier scales, these errors could enter in the use of the optical vernier interpolator because of the presence of the optical medium. If it is desired to eliminate errors in reading due to parallax, a nonrefractory body can be introduced in the system. In the linear case, the nonrefractory body may be defined as a solid staircaselike object, with outer dimensions the same as the right angle prism, and with the longest face, which corresponds to the hypotenuse side of the prism, composed of a series of upward steps whose slope matches the slope of the prism. The nonrefractory body slides freely over the vernier scale while in communication with the right angle prism. The material with which it is made can be the same optical material as that of the prism. A ray of light passing normal to the scales, and thus normal to the surface of each step, will not be refracted. On the other hand, the change of refraction suffered by the ray as it deviates from normal will, in an approximate sense, be the same whether the ray passes through the prism or the nonrefractory body. Thus, the presence of such a staircaselike body corrects for errors of parallax. Through mathematical analysis, it has been discovered further that an even greater amount of parallax error may be eliminated by increasing slightly the slope of this staircaselike body.

If a small degree of accuracy were required and costs of manufacture predominated, either of two less effective ways of correcting for parallax could be introduced: (1) In the linear case, the staircaselike body could be reduced to one step with height equal to one half the maximum height of the prism. (2) In the linear case, without a nonrefractory medium of any kind, the prism could be replaced by two smaller but similar prisms, each oriented with respect to the scales as before but with their vertexes coincident and their inclined faces forming a wedge. It is to be noted, however, that the refinements for eliminating or minimizing errors due to parallax, while making the optical vernier interpolator more practical, do not affect the basic theory.

With the problems of the prior art devices in mind, it is the general object to provide an optical vernier interpolator technique of extreme accuracy.

A further object of this invention is to provide an interpolator for the linear and the vernier scale consisting of an optical medium adapted to provide a virtual image in substantial registry with the vernier scale, and providing an interpolator scale connected to said optical medium providing a measure of the incremental difference between said vernier scale and the position of the primary scale, that is, the incremental difference between the coincident marks on the vernier scale and on the primary scale.

A further object of this invention is to provide an improved optical and vernier optical interpolator for use in connection with a primary scale and a vernier scale for providing improved measurement of the accuracy and reading characteristics on a scale.

A further object of this invention is to provide an optical interpolator adapted to be carried on a primary scale for use adjacent to a vernier scale to provide greater reading accuracy of the primary and vernier scales.

A further object of this invention is to provide an interpolator scale for use in connection with an optical vernier interpolator to override a primary scale which is adapted to move adjacent a vernier scale and to provide greater reading accuracy on the primary scale in connection with the vernier scale.

A further object of this invention is to provide greater accuracy in an optical vernier interpolator that is relatively free of parallax that will average out physical irregularities in the inscribed scale and which is not limited by the finite width of the scale markers.

It is yet a further object of this invention to provide an optical vernier interpolator which may be easily adapted to the conventional vernier scales that are familiar in the arts of machining, surveying, engineering, and in the sciences.

Other and more specific objects of the invention will become apparent when reference is made to the accompanying drawings, in which:

FIG. 8 is a geometrical drawing of the prism showing the angle of incidence and angle of refraction of a light ray passing through the prism;

FIG. 9 is a perspective view of the prism and sectional of the primary and vernier scales in their respective positions;

FIG. 10 shows the relative position of the nonrefractional medium and the prism;

FIG. 11 shows a staircaselike prism with a slope greater than the slope of its corresponding prism;

FIG. 12 shows the relative position of a simple form of nonrefractional medium and the prism; and FIG. 13 is a perspective view of a form an optical vernier interpolator in which the prism is replaced by two smaller prisms.

Figure 1:
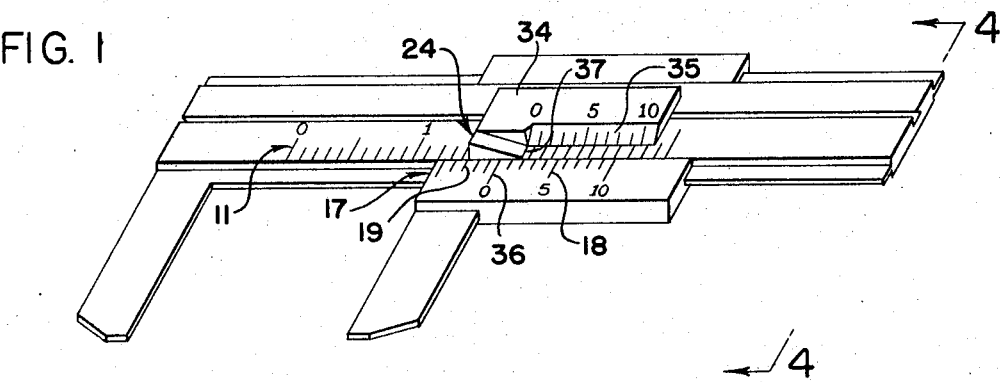
FIG. 1 is a perspective view of the optical vernier interpolator in conjunction with the primary and vernier scales of a standard vernier calipers.

In the embodiment illustrated, FIG. 1 shows a primary scale 11 having a number of major divisions inscribed thereon which are, in turn, subdivided into a series of evenly divided subdivisions. If, for example, a base number 10 were used, there would be 10 equal subdivisions for each major division. The vernier scale 17 has one major division 18 inscribed thereon which is equal to $9/10$ of a major division of the primary scale 11. This major division 18 is in turn subdivided into the same number of subdivisions as is a major division of the primary scale. Certain other scale markers 19 may extend, for convenience of reading, beyond the major division 18 of the vernier scale. These markers 19 are a continuation of the subdivisional markers within major division 18.

The fraction which relates the subdivision to the major division of either scale determines the optical properties required of the vernier interpolator. To illustrate this point, let us assume that a right angled prism, as shown in FIG. 9, is positioned over the primary scale. This prism has one face 25 parallel and above scale 11; one face 26 normal to the plane of scale 11 and face 25 on the primary scale; and one face 27 inclined at an angle $\theta_i$ to the face of plane 25. The prism is composed of optical material of refractive index $r$. The law of refraction, when expressed in reference to a ray passing through a right angle prism states that:

(1) $\qquad r = (\sin \theta_i)/(\sin \theta_r)$ where $\theta_i$ is the angle of incidence of a ray and $\theta_r$ is its angle of refraction in material of refractive index $r$. The geometric consequences of this law are expressed in FIG. 8 where the prism 24 is supported by an optical non-refractive medium 23 which overlies the vernier scale 17. Suppose now that the angle of incidence coincides with the angle of inclination of the prism, as in FIG. 8. This condition is consistent with the requirement that an observer look down in a direction normal to scales 11 and 17. It follows that an object, such as scale marker 31, placed at a point removed distance $x+y$ from the vertex 37 of the prism will have a virtual image at point $y$, where $y$ satisfies:

(2) $\qquad y = x/(\tan \theta_i), \ \theta = \theta_i - \theta_r$

The geometric truth of Equation 2 may be seen in FIG. 8. Solving Equations 1 and 2 simultaneously, one obtains:

(3) $\dfrac{x}{x+y} = \dfrac{(\tan \theta_i)(\tan \theta)}{1+(\tan \theta_i)(\tan \theta)}, \ \theta = \theta_i - \arcsin(\sin \theta_i)/r$ Equation 3 expresses the displacement fraction, which is the ratio of subdivision to major division, as a function of the angle of inclination of the prism.

Thus, when an observer looks down in a direction normal to scales 11 and 17, he sees through the inclined face 27 of the prism an interval of scale 11, each marker of which appears displaced to a different position. In the specific embodiment, it is required that the displacement fraction $x/(x+y)$ will be equal to $1/10$ and, thus, this requirement together with the restriction of Equation 3 specifies a unique angle of inclination for the prism. By designing the prism according to Equation 3 with $x/(x+y) = 1/10$, it is insured that the virtual image of the inscriptions of the primary scale visible through the prism will be identical in spacing to the inscriptions of the vernier scale.

Exemplary calculations show that with index of refraction $r=1.55$ (consistent with the index of refraction of light flint glass), the correct angle of inclination, as determined by Equation 3 with $x/(x+y) = 1/10$, is $\theta_i = 29.6°$.

Consider now a prism designed according to Equation 3 with $x/(x+y) = 1/10$. Consider that the prism is oriented over the primary scale, as in FIG. 9. It is seen that scale marker 20 on the vernier scale is the one that most nearly coincides with scale marker 21 on the primary scale. It is also the case that the vertex 37 of the prism is displaced exactly ten times farther from scale marker 21 than is scale marker 20. When an observer assumes a position of observation at a point directly above and far removed from the prism, all the scale markers of the primary scale that are visible through the prism will appear to coincide with scale markers on the vernier scale. In particular, marker 21 will appear to be directly adjacent to marker 20 on the vernier scale 17, as will marker 31 appear to be directly adjacent to marker 30. It is due to this property of the prism that the optical vernier interpolator contributes a magnification factor of ten in reading the primary and vernier scales. It is also due to this property that the apparent coincidence of a number of pairs of scale markers serves to average out physical irregularities in the inscriptions and to reduce error.

In the embodiment illustrated, the prism 24 is retained by a body 34 which is constrained to slide in a direction parallel to the primary scale 17. A tongue 22 or other suitable structure can be used to restrict the motion of the prism and the retaining body. The prism 24 is positioned over the primary scale 11. The interpolator scale 35, which is a vernier, is composed of one major division and ten equal subdivisions and is also retained in the body 34. This scale 35 has graduations that are identical to those of vernier scale 17 and it is fixed in a position parallel to the primary scale 11 and on the opposite side of it from the vernier. Thus, the interpolator scale, just like the vernier, can read in units of tenths of a subdivision of the primary scale. On the other hand, because of the multiplicative factor of ten in the displacement of the interpolator caused by the optical properties of the prism, readings on the interpolator scale, which are taken after the correct positioning of the interpolator, are in hundredths of a subdivision of the primary scale.

Figure 2:
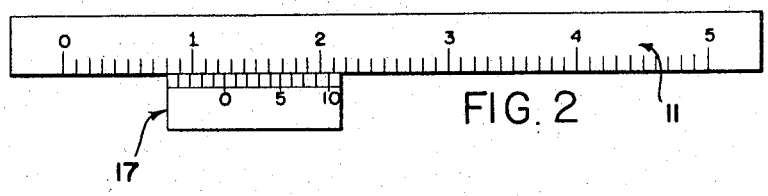
FIG. 2 shows a top view of the scales of the vernier calipers, with the scales set to read 1.24.
Figure 3:
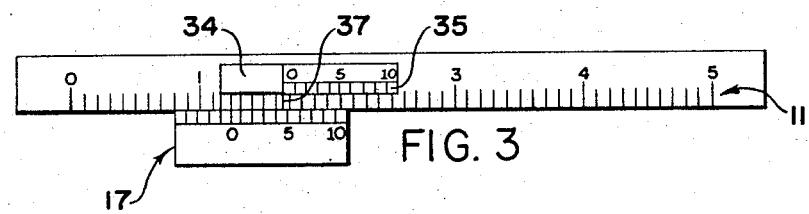
FIG. 3 shows a top view of the scales of the vernier calipers and the scale of the interpolator with the interpolator positioned in a manner which will yield the reading 1.245.
Figure 4:
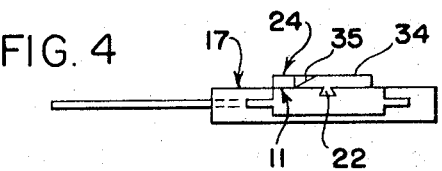
FIG. 4 is an end elevation along line 4—4 of FIG. 1.
Figure 5:
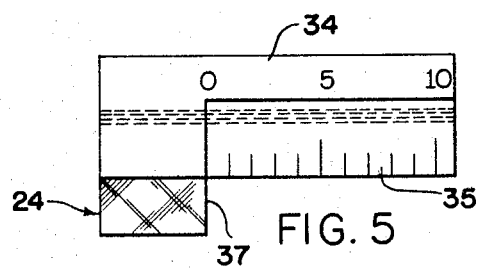
FIG. 5 is an enlarged detached plan view of the optical vernier interpolator.
Figure 7:
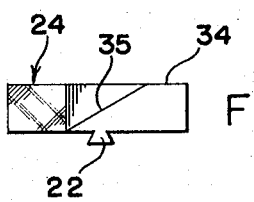
FIG. 7 is an end view of FIG. 6.
Figure 6:
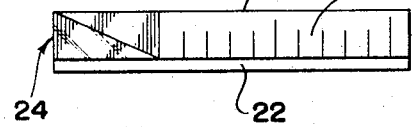
FIG. 6 is an elevation of FIG. 5.

As an example, suppose the displacement between the zero markers of the primary and vernier scales is 1.245, in units of the major divisions on the primary scale. As shown in FIG. 2, the quantity 1.24 is read with the primary and vernier scales in the usual way. The second part of the reading, which contributes the additive factor of 0.005 is initiated by setting the vertex 37 of the prism between scale markers of the vernier that read 4 and 5. The interpolator body 34 is then slid until all scale markers visible through the prism appear to coincide exactly with scale markers on the vernier scale 17. The reading 1.245 is then completed by observing, as in FIG. 3, that the fifth marker on the interpolator scale is the one which most nearly coincides with scale markers on the primary scale.

In order to eliminate errors due to parallax incurred during the setting of the interpolator, an optical body, aside from the prism, may be introduced into the system. Such a body may take various forms, examples of which are illustrated in FIG. 10, FIG. 11 and FIG. 12. Such a body is in communication with the prism and is positioned in such a way that when the interpolator is moved the body slides freely over the vernier scale. In FIG. 10 the body 32 is in the form of a stepped prism where the plane connecting the edges 32a of the stepped portions contains the prism face 27 and thus has the same slope. Such a body as 32 is nonrefractional in the sense that a ray of light passing through the body 32 and normal to the plane 25 will not be refracted. Mathematical analysis of the kind presented for the prism, however, shows that for body 32 the change of refraction suffered by the ray as it deviates from the normal will, in an approximate sense, be the same as that for a parallel ray passing through the prism 24.

The theory of the refraction of light through an optical medium with the shape of the stepped prism 32 is obtained by assuming that the steps are infinitely narrow. Thus, in theory, the shape of the nonrefractional medium 32 is precisely that of the right angle prism 24, while rays refracted through a local region of the stepped surface with edges 32a behave as though, in that local region, the surface were horizontal. For such a stepped prism 32 that is paired with a right angled prism 24 as in FIG. 10, the error of measurement due to parallax can be deduced from the known laws of optics. Exemplary calculations show that the error will be less than ½% of the length of the prism under normal conditions of use. (Normal conditions of use are defined as the angle of observation being within ten degrees of the normal to the plane 25 that contains the scales.) Thus, an optical vernier interpolator with a prism of length $\frac{2}{10}$ of an inch and a nonrefractive body of the type illustrated in FIG. 10 will not induce parallex errors in excess of $\frac{1}{1000}$ inch.

The simplest, and crudely effective, nonrefractive medium of the stepped prism type is illustrated in FIG. 12. Here the nonrefractory body is simply a rectangular block 23' with height equal to one half the height of the prism. Such a design is of use if a small degree of accuracy is required and costs of manufacture predominate.

Another form of parallax corrector is illustrated in FIG. 11. A stepped prism 33, whose steps define a plane inclined an additional few degrees beyond the slope of the accompanying prism, provides a slight improvement over the design of FIG. 10. Mathematical analysis can be used to determine the optimum increase of slope for minimizing measurement errors due to parallax. Exemplary calculations verify that under typical conditions and with typical materials an increased slope of approximately 3° beyond the slope of the accompanying prism will make the parallax corrector 33 most effective. A parallax error of less than $\frac{1}{10}\%$ of the length of the prism can be achieved. This percentage error corresponds to measurement with accuracy near $\frac{1}{5000}$ inch.

The calculations concerning the effectiveness of parallax correctors do not take into account the increased accuracy that can be obtained with an optical vernier interpolator by taking advantage of its statistical properties. By reading simultaneously more than one paired coincidence of scale markers, the minute irregularities in scale marker impressions are averaged out. By reading the interpolator scale after each of a series of interpolator settings, and by averaging the results, the small random errors of any one setting are averaged out. The latter type of averaging, if extended over sufficiently many readings, yields a result which, under the best conditions, is independent of the thickness of the scale markers.

A design for minimizing parallax error without the use of optical means other than prisms is illustrated in FIG. 13. In this design, two small prisms 38 geometrically similar to the prism of FIG. 9 are used. Their inclined faces form a wedge and their common vertexes 39 define a line which must be displaced a specific distance from the zero marker of the interpolator scale 35. The specific distance required is some integral multiple of subdivisions of the primary scale. The design of FIG. 13 is equivalent in accuracy to the design of FIG. 12 and has certain advantages due to the symmetry and the reduced height of the prisms 38.

In any design for an optical vernier interpolator, for example, that illustrated in FIG. 1, a slight translation of the prism with respect to the interpolator scale is required if the face 25 of the prism that is parallel to the scale 11 is not in contact with the scale. This slight modification of design, sometimes necessary for practical purposes to prevent scratching the prism, introduces no change in the theory. The extent of the translation of the prism required is exactly equal to the separation between prism face 25 and scale 11 and the direction of the translation is away from the zero marker of the interpolator scale 35 when the prism is oriented as in FIG. 1. This means that if the prism face 25 were lifted parallel and away from the scale 11 by $\frac{1}{100}$ inch, then the prism vertex 37 would have to be placed $\frac{1}{100}$ inch before the zero marker of the interpolator scale 35, when the prism is oriented as in FIG. 1.

Practical adaptations of this optical vernier interpolator have shown that it is exceedingly useful in measuring devices of various kinds. Where linear scales are not used, obvious modifications of the embodiment illustrated are necessary. The same interpolator device without the interpolator scale has been incorporated into a slide rule form of random number generator as described in my copending application, Ser. No. 365,626.

For ease of description, the principles of the invention have been set forth in full in connection with but a single illustrated embodiment. It is not my intention that the illustrated embodiment, nor the terminology employed in describing it, be limiting inasmuch as variations in these may be made without departing from the spirit of the invention. Rather, I desire to be restricted only by the scope of the appended claims.

What I claim is:

1. In a device of the character described, first scale having markings indicating major divisions and subdivisions, a first vernier scale contiguous to said first scale and having a zero mark indicating displacement on said first scale and vernier division markings thereon, an interpolator movable along and parallel to said first vernier scale and comprising optical means on the interpolator presenting a third scale with divisions spaced as on said first vernier scale so as to be alignable with the divisions of said first vernier scale whereby the interpolator may be positioned in a first position which is dependent on the displacement of a particular vernier scale division of said first vernier scale from an adjacent one of said first scale marks, said particular vernier scale division being the division marking on said first vernier scale which is closest to a subdivision mark on said first scale, and additional scale means, said additional scale means including scale means being coupled to and movable with said interpolator and set when said interpolator is in said first position to indicate the displacement of said interpolator relative to said one of said major division markings whereby the setting of said first vernier scale relative to said first scale may be at least partially read from said additional scale means.

2. In a device of the character described and as defined in claim 1 wherein said optical means on said interpolator forms a variably refracted image of said first scale.

3. In a device of the character described and as defined in claim 2 in which said additional scale means comprises a vernier scale on said interpolator and disposed adjacent said primary scale to cooperate therewith.

4. In a device of the character described and as defined in claim 2 wherein said optical means comprises a prism having a first face extending along and parallel to said first scale and viewing face extending from said first face at an acute angle with respect to said first face and presenting a refracted image of said first scale.

5. In a device of the character described and as defined in claim 4 wherein said additional scale means comprises a vernier scale mounted on said interpolator and cooperating with said primary scale and having a zero mark disposed in a predetermined position with respect to the line of intersection of the planes of said prism face.

6. In a device of the character described and as defined in claim 5 wherein said interpolator means further comprises a body of optical material positioned adjacent said prism and overlying said first vernier scale and having a face adjacent and parallel to said first vernier scale and a nonrefractive viewing face opposite said first face which is nonrefractive to rays normal to the first vernier scale whereby parallax between first primary scale and first vernier scale is reduced when the primary scale and first vernier scale are viewed through the optical body and the prism.

7. In a device of the chacater described a primary scale having division markings thereon, a vernier scale cooperating with said primary scale and having a zero mark for indicating displacements along said primary scale and vernier scale markings to be read in cooperation with said primary scale markings to indicate the displacement of the zero mark of the vernier scale from a mark on said primary scale, an optical interpolator to be precisely positioned along said primary scale in accordance with the displacement from an adjacent primary scale marking of a marking on the vernier scale, said interpolator comprising a prism for overlying a portion of said primary scale and movable adjacent and parallel to said vernier scale, said prism having a viewing side lying in a plane defining an acute angle with the plane of said primary scale and comprising a refractive medium to provide a contracted virtual image of the primary scale markings with spacing between markings that coincides with the spacing of the vernier scale markings and thereby providing for a prism setting where the markings of the primary scale viewed through said prism coincide with the markings of said vernier scale, and means on and movable with said interpolator to indicate with reference to said primary scale an interpolation of the setting of said vernier scale relative to said primary scale when the markings of said contracted virtual image and said vernier scale markings are aligned.

8. A device as defined in claim 7 wherein a body of optical material is positioned adjacent said prism and overlies said vernier scale and has a side surface parallel to and adjacent said vernier scale and a nonrefractive viewing surface opposite said side surface which is nonrefractive for rays normal to the vernier scale whereby parallax between said primary scale and vernier scale is reduced when the primary scale is viewed through said prism.

9. A device as defined in claim 8 wherein said optical body is a staircase stepped prism with the stepped side of said prism constituting said viewing surface.

10. In a device as defined in claim 7 wherein said optical means comprises a pair of prisms having first sides in a plane parallel to the plane of said primary scale and sides which extend at an acute angle in different directions away from the plane of said first side and which define vertexes of the respective prisms, said vertexes lying adjacent to each other.

11. A device as defined in claim 9 wherein the angle of said stepped side is approximately the same angle as the angle of said viewing side of said prism relative to the plane of said vernier scale.

12. A device as defined in claim 9 wherein said angle of said stepped side is about 3° greater than the angle of the viewing side of said prism.

References Cited

UNITED STATES PATENTS

| | | |
|---|---|---|
| 1,671,272 | 5/1928 | Buckingham _____ 350—112 |
| 2,651,235 | 9/1953 | Barrows. |
| 3,068,741 | 12/1962 | Werner _____ 350—112 X |
| 942,393 | 12/1909 | Konig. |
| 2,436,567 | 2/1948 | Gould. |
| 2,474,044 | 6/1949 | Forrest. |
| 2,792,741 | 5/1957 | Mazzon. |
| 3,130,923 | 4/1964 | Goodbar _____ 350—285 X |

RONALD L. WILBERT, *Primary Examiner.*

WARREN A. SKLAR, *Assistant Examiner.*

U.S. Cl. X.R.

33—1, 143; 235—70.2; 350—112; 356—171